(12) United States Patent
Powell

(10) Patent No.: US 7,223,102 B2
(45) Date of Patent: May 29, 2007

(54) RHYMES TABLES MATH EXPERTISE SYSTEM

(75) Inventor: Larissa Powell, 10259 N. Pinion Dr., Pleasant Grove, UT (US) 84062

(73) Assignee: Larissa Powell, Pleasent Grove ( * ) Notice: Subject to any disclaimer, the term of this patent is extended or adjusted under 35 U.S.C. 154(b) by 197 days.

(21) Appl. No.: 10/854,587

(22) Filed: May 26, 2004

(65) Prior Publication Data

US 2005/0069850 A1 Mar. 31, 2005

Related U.S. Application Data

(60) Provisional application No. 60/474,848, filed on Jun. 2, 2003.

(51) Int. Cl.
*G09B 19/02* (2006.01)
*G09B 23/02* (2006.01)

(52) U.S. Cl. .................. 434/188; 434/191; 434/209

(58) Field of Classification Search ............ 434/188, 434/191, 193–195, 201, 205–209, 428, 365, 434/322, 416
See application file for complete search history.

(56) References Cited

U.S. PATENT DOCUMENTS

| | | | | |
|---|---|---|---|---|
| 2,265,699 A | * | 12/1941 | Osborne | 434/193 |
| 2,481,058 A | * | 9/1949 | Zarlengo | 434/205 |
| 4,382,794 A | * | 5/1983 | Preus | 434/193 |
| 5,529,497 A | * | 6/1996 | Bigold | 434/191 |
| 6,447,300 B1 | * | 9/2002 | Greenberg | 434/188 |
| 2003/0170595 A1 | * | 9/2003 | Thompson | 434/159 |

* cited by examiner

*Primary Examiner*—Eugene Kim
*Assistant Examiner*—Alyssa M. Hylinski

(57) ABSTRACT

A system and method for teaching basic mathematical operations and facts; and more particularly it is an apparatus for development of accurate conceptual models for small children in learning certain math facts for the first time. The present invention takes into account that a true conceptual model must consistently and accurately reflect the target system and consider the characteristics of the children learners. In this invention, every digit of any number gets a familiar yet consistent name; that name can be weaved into story and rhyme throughout the learning process in both the math questions and in the math answers. The consistent "name for a digit" advancement over the prior art is better because it creates a conceptual model to which children can indeed relate. Digit consistency throughout the system, series, or television program, helps teachers create relevant meaningful application activities or associative modus operandi.

6 Claims, 4 Drawing Sheets

CHART #1

| 1x1 = 1 | 1 x 2 = 2 | 1 x 3 = 3 | 1 x 4 = 4 | 1 x 5 = 5 | 1 x 6 = 6 | 1 x 7 = 7 | 1 x 8 = 8 | 1 x 9 = 9 | 1 x 10 = 10 | 1 x 11 = 11 | 1x 12 = 12 |
|---|---|---|---|---|---|---|---|---|---|---|---|
| 2 x 1 = 2 | 2 x 2 = 4 | 2 x 3 = 6 | 2 x 4 = 8 | 2 x 5 = 10 | 2 x 6 = 12 | 2 x 7 = 14 | 2 x 8 = 16 | 2 x 9 = 18 | 2 x 10 = 20 | 2 x 11 = 22 | 2 x 12 = 24 |
| 3 x 1 = 3 | 3 x 2 = 6 | 3 x 3 = 9 | 3 x 4 = 12 | 3 x 5 = 15 | 3 x 6 = 18 | 3 x 7 = 21 | 3 x 8 = 24 | 3 x 9 = 27 | 3 x 10 = 30 | 3 x 11 = 33 | 3 x 12 = 36 |
| 4 x 1 = 4 | 4 x 2 = 8 | 4 x 3 = 12 | 4 x 4 =16 | 4 x 5 = 20 | 4 x 6 = 24 | 4 x 7 = 28 | 4 x 8 = 32 | 4 x 9 = 36 | 4 x 10 = 40 | 4 x 11 = 44 | 4 x 12 = 48 |
| 5 x 1 = 5 | 5 x 2 = 10 | 5 x 3 = 15 | 5 x 4 = 20 | 5 x 5 = 25 | 5 x 6 = 30 | 5 x 7 = 35 | 5 x 8 = 40 | 5 x 9 = 45 | 5 x 10 = 50 | 5 x 11 = 55 | 5 x 12 = 60 |
| 6 x 1 = 6 | 6 x 2 = 12 | 6 x 3 = 18 | 6 x 4 = 24 | 6 x 5 = 30 | 6 x 6 = 36 | 6 x 7 = 42 | 6 x 8 = 48 | 6 x 9 = 54 | 6 x 10 = 60 | 6 x 11 = 66 | 6 x 12 = 72 |
| 7 x 1 = 7 | 7 x 2 = 14 | 7 x 3 = 21 | 7 x 4 = 28 | 7 x 5 = 35 | 7 x 6 = 42 | 7 x 7 = 49 | 7 x 8 = 56 | 7 x 9 = 63 | 7 x 10 = 70 | 7 x 11 = 77 | 7 x 12 = 84 |
| 8 x 1 = 8 | 8 x 2 = 16 | 8 x 3 = 24 | 8 x 4 = 32 | 8 x 5 = 40 | 8 x 6 = 48 | 8 x 7 = 56 | 8 x 8 = 64 | 8 x 9 = 72 | 8 x 10 = 80 | 8 x 11 = 88 | 8 x 12 = 96 |
| 9 x 1 = 9 | 9 x 2 = 18 | 9 x 3 = 27 | 9 x 4 = 36 | 9 x 5 = 45 | 9 x 6 = 54 | 9 x 7 = 63 | 9 x 8 = 72 | 9 x 9 = 81 | 9 x 10 = 90 | 9 x 11 = 99 | 9 x 12 = 108 |
| 10 x 1 = 10 | 10 x 2 = 20 | 10 x 3 = 30 | 10 x 4 = 40 | 10 x 5 = 50 | 10 x 6 = 60 | 10 x 7 = 70 | 10 x 8 = 80 | 10 x 9 = 90 | 10 x 10 = 100 | 10 x 11 = 110 | 10 x 12 = 120 |
| 11 x 1 = 11 | 11 x 2 = 22 | 11 x 3 = 33 | 11 x 4 = 44 | 11 x 5 = 55 | 11 x 6 = 66 | 11 x 7 = 77 | 11 x 8 = 88 | 11 x 9 = 99 | 11 x 10 = 110 | 11 x 11 = 121 | 11 x 12 = 132 |
| 12 x 1 = 12 | 12 x 2 = 24 | 12 x 3 = 36 | 12 x 4 = 48 | 12 x 5 = 60 | 12 x 6 = 72 | 12 x 7 = 84 | 12 x 8 = 96 | 12 x 9 = 108 | 12 x 10 = 120 | 12 x 11 = 132 | 12 x 12 = 144 |

CHART # 2

| 2x2=4 | 2x3=6 | 2x4=8 | 2x5=10 | 2x6=12 | 2x7=14 | 2x8=16 | 2x9=18 | 2x12=24 |
|---|---|---|---|---|---|---|---|---|
| | 3x3=9 | 3x4=12 | 3x5=15 | 3x6=18 | 3x7=21 | 3x8=24 | 3x9=27 | 3x12=36 |
| | | 4x4=16 | 4x5=20 | 4x6=24 | 4x7=28 | 4x8=32 | 4x9=36 | 4x12=48 |
| | | | 5x5=25 | 5x6=30 | 5x7=35 | 5x8=40 | 5x9=45 | 5x12=60 |
| | | | | 6x6=36 | 6x7=42 | 6x8=48 | 6x9=54 | 6x12=72 |
| | | | | | 7x7=49 | 7x8=56 | 7x9=63 | 7x12=84 |
| | | | | | | 8x8=64 | 8x9=72 | 8x12=96 |
| | | | | | | | 9x9=81 | 9x12=108 |
| | | | | | | | 11x11=121 | 11x12=132 |
| | | | | | | | | 12x12=144 |

CHART #3

| | |
|---|---|
| ONE | SUN, FUN, RUN, DONE, HUN, BUN, GUN, NUN, PUN, RUN, TON, WON |
| TWO | SHOE, BOO, DO, GOO, EWE, LOU, MEW, NEW, PEW, Q, SUE, YOU, ZOO |
| THREE | TREE, BEE, DEE, FREE, GLEE, HE, ME, PEA, SEA, SEE, TEA, WE |
| FOUR | DOOR, FLOOR, BORE, BOAR, SOAR, GORE, MORE, POUR, ROAR, TORE, WAR, YOUR |
| FIVE | HIVE, JIVE, DIVE, I'VE, KLIVE, KNIFE, LIFE, WIFE |
| SIX | STICKS, WICKS, SICKS, TRICKS, FLICKS, HICKS, LICKS, MIX, PICKS, QUICKS, RICK'S, DICK'S, TICS, VICK'S |
| SEVEN | HEAVEN, KEVIN, DEVIN, SVEN, STEVEN |
| EIGHT | STRAIGHT, MATE, SKATE, GREAT, BAIT, DATE, FATE, HATE, KATE, LATE, NATE, RATE, WAIT |
| NINE | FINE, DINE, DIME, HIND, BIND, KIND, LINE, MINE, PINE, RYAN, RIND, SIGN, VINE, WINE, WHINE |
| TEN | BEN, DEN, GWEN, HEN, JEN, KEN, LEN, MEN, PEN |
| ELEVEN | ELY, ELLEN, MELVIN, STEPHEN, ELEPHANT, ELLE |
| TWELVE | ELF, ELVES, SHELF, SHELVES, DWELLS, DELVES, ELVIS |

FIGURE #4
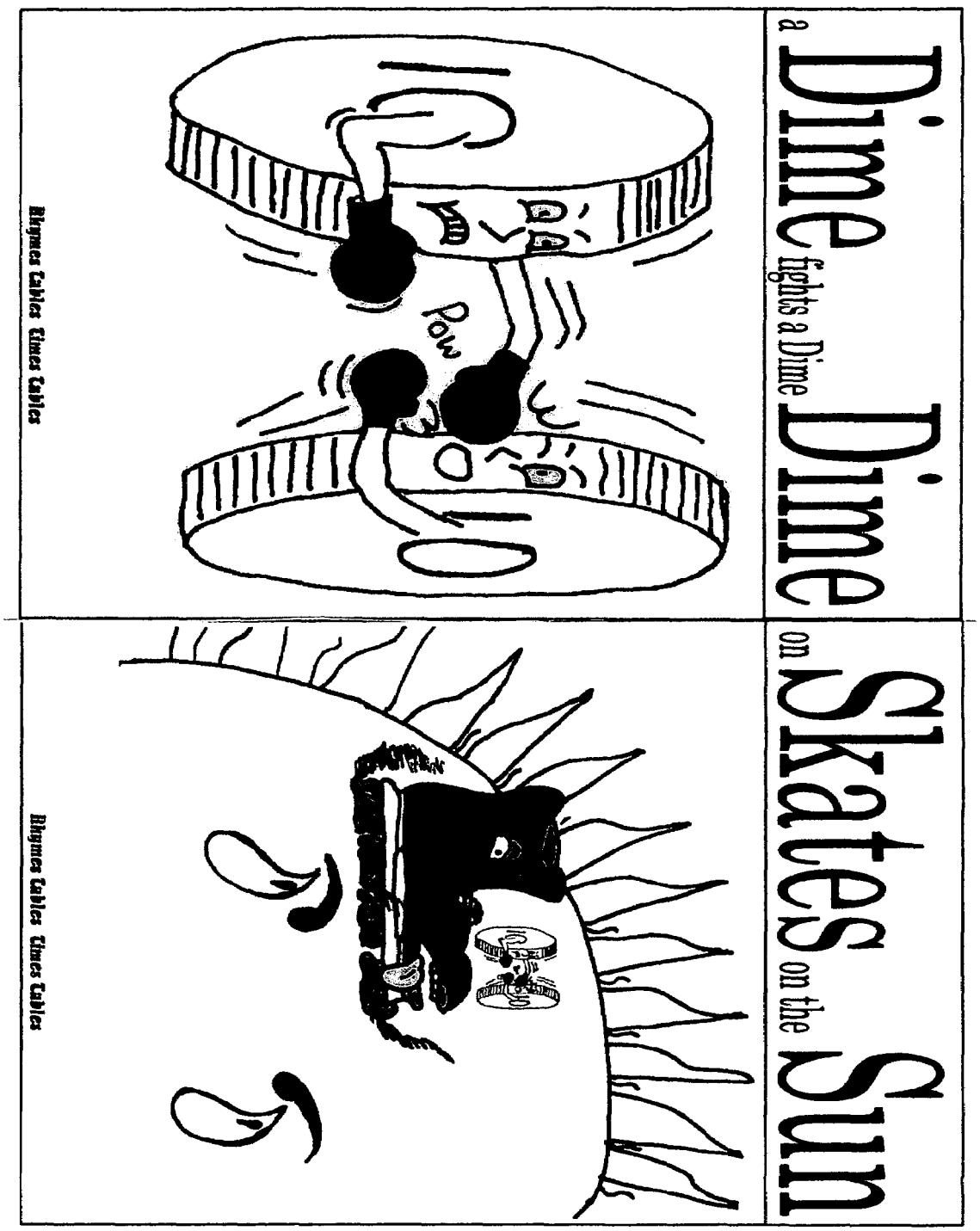

RHYMES TABLES MATH EXPERTISE SYSTEM

RELATED APPLICATIONS

Priority is claimed to a Provisional Patent Application No. 60/474,848 submitted on Jun. 2, 2003 entitled Rhymes Tables Math Expertise System under same inventor, Larissa Powell, confirmation number 6867.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING

Not Applicable

BACKGROUND OF THE INVENTION

The present invention relates to a system of teaching basic mathematical operations and facts and more particularly relates to a system and apparatus for development of accurate conceptual models for small children in learning certain math facts for the first time. The present invention takes into account that a true conceptual model must consistently and accurately reflect the target system and consider the characteristics of the children learners.

BRIEF SUMMARY OF THE INVENTION

Small children and other learners who are dealing with certain math facts for the first time (such as but not limited to multiplication), often experience great difficulty because small children have no previous cognitive model similar enough to the number manipulation tasks required in learning and mastering the math facts from which to relate. The present invention applies a paradigm based learning model which in many ways mirrors the expert and novice distinctions of modern cognitive developmental theory but in this case supplies the age familiar cognitive framework that has previously not been used in the prior art.

In other words, children, in a simplistic realm, are indeed already experts at very particular things such as, story telling, rhyming, and/or other imagination games. Our present invention merely makes use of those inherent expert traits and unlocks the child's natural ability for memorization.

Unlike previous attempts at using the story telling, rhyming, and/or imaginations games, the present invention does more than just make up rhymes and song. Consider for example, the "one, two—buckle my shoe" rhyme. Rhymes and songs like those used in the prior art may be a media that is familiar to small children, but in those songs and rhymes, the authors have often focused on the aesthetic and artistic aspects rather than a consistent familiar cognitive framework.

In the present invention, digit consistency in rhyming is the process whereby the teacher helps the student to develop a true conceptual model. The artistic or aesthetic aspects of the name given to the digit name are not as important as the framework, although pleasing rhymes may result or develop naturally.

When every digit of any number gets a familiar yet consistent name, that name can be weaved into story and rhyme throughout the learning process in both the math question and in the math answer. The consistent "name for a digit" advancement over the prior art is better because it creates a conceptual model to which children can indeed relate. Many of the prior art times-tables teaching systems only partially tapped into this inherent expertise in children by creating rhymes, songs, and story in the attempt to make the remembering of multiplication facts more fun: practically everyone is familiar with the Saturday morning television shows with the singing of multiplication songs. These old songs or rhymes, however, differ from the present invention in that they do not create a truly consistent conceptual model.

In the prior art, the numbers were used in the songs and rhymes out of a convenience to the song writing process. Without consistency throughout the system series or television program, there can be no relevant content, meaningful application activities, or associative modus operandi. The children must simply learn the words of the song or rhyme. Those prior teaching systems really were just for the fun of it all. They were not developed from a truly consistent conceptual model framework.

Periodically one may find a name for a number in the prior art, but previous systems for teaching children math facts did not exist where consistent names for digits in both the math fact question and in the math fact answer were used and did not change throughout the problem or the entire learning process. Instead, the prior art which may have come closest to the present invention, used names for the numbers not individual names just for the digits. Even the number names in the prior art were subject to change during the students learning of the various songs or rhymes. Unlike the prior art, consistent "name for a digit" framework can truly unlock the child's own expertise.

Those prior art systems may have taken to naming certain numbers using those names to present the math fact problems, but did not keep those names consistent throughout the problem, answer, and entire learning program. For example, prior art math games might have used the word "TREE" in their rhyme for the number three (3), or the word "STICKS" in their rhyme or song for the number six (6), but then used something like "DIRTY TRICKS" in their rhyme or song for the number thirty six (36). It is clear that for a truly consistent conceptual model in this example, the word(s) for thirty-six should also have been derived from "TREE-STICKS" also, in order to keep digit consistency in this example.

BRIEF DESCRIPTION OF THE CHARTS AND FIGURES

The math facts to be mastered in the preferred embodiment are multiplication facts from one (1) to twelve (12). Chart #1 shows all the possible multiplication facts and answers to be mastered in the preferred embodiment example. In total there are one hundred forty-four (144) facts to master in the preferred embodiment. In our preferred embodiment, we cut that down considerably by taking advantage of both the duplications and the obvious. To take care of the duplications, we always ask students to put the lowest number in the math fact first. For example, nine times three (9×3) would be changed to three times nine (3×9) and so on for all facts. We also eliminate the obvious facts and just teach the basic rule for all the ones, tens, and most of the elevens: ones being the identity rule, the tens being the "add a zero" rule, and the elevens rule for single digits of just using the same number twice (11, 22, 33, 44 etc.).

Chart #2 shows the remaining 47 math facts. Sixteen (16) more of those facts (shown as shaded cells on the chart) can be quickly eliminated as children often master there doubles quickly and the 5 facts the learn from telling time; leaving only 31 which alone can suffice for the mastery of all 144 multiplication facts up to twelve (12).

With the number of facts to be mastered narrowed down to just 31 facts, a beginning step in teaching those facts to the students is to find rhyming names for each digit in our consistent decimal digit system. In the preferred embodiment, for young children such as 3 to 5 years of age or younger, we sometimes have the instructor give those rhyming names for each digit. For other children in the preferred embodiment who seem to be capable of the necessary teacher pupil interaction skills such as older children of 5 to 9 years of age, we might let the student pick the names from a list of names to better help them develop their own frame of reference.

Chart #3 shows just some of the possible rhyming names that could be used in the preferred embodiment. Once the rhyming name is chosen for a particular digit for a particular student, the rhyming name remains constant throughout the learning process for that student. The names for the digits shown in chart #3 are just some examples of the names that could be used, but any other names could be used even if not a good rhyme. The cognitive benefit does not come so much from the name for the digit, but rather the ability for students to have an existing frame of reference that is familiar to them. A rhyming name is helpful to the student in moving back and forth from their familiar frame of reference to the actual number digit reference in mastering multiplication.

Children learning mathematics in the preferred embodiment merely need to memorize the new names for the numbers. Then, rather than memorizing number facts, they merely need to remember the story or rhyme that they created or has been created for them. The rhyming words for eleven (11) and twelve (12) may either be the digits one/one or one/two respectively or a separate rhyming word may be created for these special two digit numbers; otherwise we stick to the naming of individual digits in the answers for consistency.

Once the consistent names for digits are chosen or given to the student, the student can then apply them to some particular math facts. To help the student apply those names or pictures, a delivery method may be used. FIG. 4 shows an example in the preferred embodiment where the name and picture substitution is depicted on card stock and might be names for digits chosen by a typical small child. In this example it is clear that the aesthetic and artistic quality of the digit name and picture or even how well the name actually rhymes with the number digit is not as important as allowing the student to develop their own frame of reference as well as digit consistency in both the math question and the math answer. As we look closely at FIG. 4 we see that in the math fact "9×9=81," the word dime is used for the substitute of the digit nine (9) despite the fact that "dime" is not even a very good rhyme for nine (9). Yet, in our experience in using this invention in the preferred embodiment, the types of familiar cognitive frameworks that children often choose for themselves tend to be the most helpful rather than those names or picture substitutes that the instructor finds aesthetically or artistically pleasing. Also note in FIG. 4 that the rhymes for the answer are given in digit rhymes, "skates" and "sun." Those same digit rhyming words for eight and one would also be used consistently in other math facts such as 3×6=18. We would not create other rhyming words for number 18 different from the rhyming words for 81, rather the rhyme for 18 answers would also involve "sun" and "skates" with the sun coming first and then the skates.

DETAILED DESCRIPTION OF THE INVENTION

Unlike other commercially available math fact teaching programs, which have created systems that employed song or rhyme in their teaching, the present invention does not lack digit consistency throughout. The present invention is much more than just another song or rhyme to help memorize math facts. The present invention is truly a consistent conceptual model that creates the framework whereby children can learn that they are already experts at memorization of mathematical or other learning facts.

The delivery method of the conceptual learning model can be almost anything capable of showing pictures, playing sounds, or even a combination of pictures or sounds. A computer program, videotape, or audiotape may be an excellent delivery method in some embodiments of the invention. In another embodiment of the invention, small pieces of felt are cut into shapes of numbers and pictures which can be stuck onto a felt board and thereby moved, placed, or replaced as needed to tell a story or rhyme. In the preferred embodiment, however, the delivery system uses pictures and numbers on laminated pages or card stock along with an instruction manual for the parent or teacher to follow along as they present the materials to the students.

If the students already know the easier math facts such as their ones (1s), twos (2s), fives (5s), tens 10s) and most of the elevens (11s), only the basic thirty-one (31) math fact stories need to be mastered to complete the entire table of math facts to twelve.

The use of teacher training is helpful in the preferred embodiment to help the student learn the relationships allowing them to move back and forth from the "name for a digit" frame of reference to the actual math fact, but the program could be modified to a self-help program as well. It is common that in those situations where the student has had difficulty in remembering the story or rhyme that they be encouraged to modify the story however they see fit to make it "their own." When the student has indeed created or accepted their own frame of reference, they naturally develop their own abilities to step between the created fact patterns and the actual number fact patterns. They truly have used their own natural but hidden expertise in mastering those math facts.

Having chosen all the names for digits zero through nine (0-9) and chosen a delivery method, the teaching of the math facts begins. In situations where the child has made up their own digits and own story rhymes, we often find that they already know all the facts because they have already created there own conceptual framework. For those children, all that is required is an occasional refresher to allow the student to look over the storyboards briefly to remind themselves of their own digit rhyming words and their own "facts" of the story.

For those smaller children in the preferred embodiment where the teacher has given them the rhyming names and prepared the story charts for them, the teacher will read the story to them for each math fact while showing them the pictures. The teacher will then go back to the digit charts to remind the student which numbers go with which rhyming names such as "three—tree" or "six—sticks." The teacher can then go between the story charts and the digit charts as many times as it takes until it seems that the child can remember all the basic story "facts." The teacher may then switch over to just number facts on normal flash cards without the pictures. We find that students can remember the stories simply by looking at the numbers in the multiplication fact flash cards. Once these children have mastered the story facts, all that is required is an occasional refresher to allow the student to look over the storyboards briefly to remind themselves of the digit rhyming words and the story "facts."

In summary, it is the digit consistent conceptual framework that allowed the math facts not to just be taught to the student using this invention, but rather those math facts had simply been "unlocked" using the expert framework that the student already had within themselves.

I claim:

1. A method of teaching math facts to student(s) comprising: defining math facts to be mastered by said student(s) in terms of math fact questions and math fact answers; defining number digits zero through nine (0-9); defining an individual symbol, name, picture, figure or other coherent substitute specific for each said number digits; maintaining digit consistency for said symbol, name, picture, figure or other coherent substitute for each said number digits throughout said math fact questions and answers by linking said symbol, name, picture, figure or other coherant substitute to a familiar word wherin each said word correlates with each said number digit; maintaining digit consistency for said linking in both the fact question and in the fact answer for all digits regardless of whether contained in multidigit or single digit numbers; and displaying or otherwise delivering said symbol, name, picture, figure, or other coherent substitute for said number digits to said student(s).

2. The method of digit consistency of claim 1, comprising: using said symbol, name, picture, figure or other coherent substitute in place of said digit; and using said symbol, name, picture, figure or other coherent substitute in both single digit and double digit numbers.

3. The method of digit consistency in claim 1 comprising: using said symbol, name, picture, figure or other coherent substitute in place of said digit; and using said symbol, name, picture, figure or other coherent substitute in multiple math fact questions and multiple math fact answers.

4. The method of displaying or otherwise delivering in claim 1 comprising: using said symbol, name, picture, figure or other coherent substitute in drawings, audiotapes, teachers manuals, video, computer screens, or any other human communication medium.

5. The method of displaying or otherwise delivering in claim 1 comprising: using said symbol, name, picture, figure or other coherent substitute; using said symbol, name, picture, figure or other coherent substitute in speech, instruction, or any human communication between teacher and student.

6. A system of teaching math facts to student(s) comprising: math fact questions and math fact answers; means for display representation of a symbol, name, picture, figure or other coherent substitute for a each digit number zero through nine (0-9); means for correlating said display representation of a symbol, name, picture, figure or other coherent substitute for a each said digit number zero through nine (0-9) with an alternate word assigned to each said digit number in said math fact questions and math fact answers; means for digit consistency for said symbol, name, picture, figure or other coherent substitute for said number digits throughout all said math fact questions; means for digit consistency for said symbol, name, picture, figure or other coherent substitute for said number digits throughout all said math fact answers; and means for delivery of said display representation of a symbol, name, picture, figure or other coherent substitute for—each said digit number to said student(s).

* * * * *